United States Patent [19]
Johnston et al.

[11] Patent Number: 4,814,760
[45] Date of Patent: Mar. 21, 1989

[54] INFORMATION DISPLAY AND ENTRY DEVICE

[75] Inventors: James P. Johnston, Westford; Donald L. Russell, Chelmsford, both of Mass.

[73] Assignee: Wang Laboratories, Inc., Lowell, Mass.

[21] Appl. No.: 45,732

[22] Filed: Apr. 30, 1987

Related U.S. Application Data

[63] Continuation of Ser. No. 687,070, Dec. 28, 1984, abandoned.

[51] Int. Cl.⁴ ............................................. G09G 3/36
[52] U.S. Cl. .................................. 340/784; 340/706; 340/707; 340/712; 178/18
[58] Field of Search ............... 340/707, 723, 708, 712, 340/706, 765, 784, 365 R, 365 VL; 178/18; 364/521

[56] References Cited

U.S. PATENT DOCUMENTS

| | | | |
|---|---|---|---|
| 3,816,824 | 6/1974 | Thust et al. | 340/789 |
| 4,017,848 | 4/1977 | Tannas | 340/365 R |
| 4,078,257 | 3/1978 | Bagley | 340/365 R |
| 4,177,354 | 12/1979 | Mathews | 340/707 |
| 4,224,615 | 9/1980 | Penz | 340/712 |
| 4,290,061 | 9/1981 | Serrano | 340/365 VL |
| 4,303,916 | 12/1981 | Hakaridani | 340/712 |
| 4,334,219 | 6/1982 | Paulus | 340/712 |
| 4,345,248 | 8/1982 | Togashi | 340/707 |
| 4,367,465 | 1/1983 | Mati | 340/707 |
| 4,371,893 | 2/1983 | Rabeisen | 340/707 |
| 4,377,810 | 3/1983 | Wolff | 340/707 |
| 4,405,921 | 9/1983 | Mukaiyama | 340/784 |
| 4,475,161 | 10/1983 | Stock | 364/521 |
| 4,475,239 | 10/1984 | van Raamsdonk | 340/365 R |
| 4,520,357 | 5/1985 | Castleberry et al. | 340/706 |
| 4,567,480 | 1/1986 | Blanchard | 340/706 |
| 4,630,039 | 12/1986 | Shimada | 340/723 |
| 4,639,720 | 1/1987 | Rympalski et al. | 340/707 |

FOREIGN PATENT DOCUMENTS

| | | | |
|---|---|---|---|
| 0072422 | 6/1978 | Japan | 340/365 R |
| 0119899 | 9/1979 | Japan | 340/365 R |
| 0083922 | 6/1980 | Japan | 340/365 R |
| 0035277 | 2/1984 | Japan | 382/13 |
| 2026745 | 2/1980 | United Kingdom | 340/712 |

Primary Examiner—Gerald L. Brigance
Assistant Examiner—Mahmoud Fakahi-yar
Attorney, Agent, or Firm—Michael H. Shanahan; Kenneth L. Milik

[57] ABSTRACT

A device for both entering and displaying information includes imaging circuitry in which a plurality of elements each has a visual characteristic which is visible at a writing surface and which depends on electrically stimulating the element via conductive circuitry, the imaging circuitry is arranged to produce electrical manifestations at the conductive circuitry in response to writing stimuli, and the device also includes control circuitry which delivers electrical signals to the conductive circuitry to form an image and converts the electrical manifestations into digital form.

9 Claims, 4 Drawing Sheets

INFORMATION DISPLAY AND ENTRY DEVICE

This is a continuation of copending application Ser. No. 687,070 filed on Dec. 28, 1984 now abandoned.

BACKGROUND OF THE INVENTION

This invention relates to entering information into, and displaying information from a data processor.

One device for displaying such information is the well-known liquid crystal display (LCD) which has a special liquid crystal material held between two parallel glass faces. The liquid crystal material temporarily changes its molecular structure, and thus its appearance, when subjected to an electrical field. Appropriately shaped transparent electrodes printed on the glass faces establish such an electrical field in the liquid crystal material to form a desired image, such as numbers representing the time of day.

One device for entering information into a data processor is a touch pad on which the user "writes" either with his finger, a pen, or a special purpose stylus. Corresponding electrical signals are generated by one of several techniques, including electromagnetic induction, variable capacitance, make-and-break switching, or grids of parallel infrared beams. Some touch pads have soft membrane surfaces which must be depressed to be activated.

The computer may be arranged so that whatever is "written" on the pad is immediately displayed back to the user on the computer's CRT display.

Another data entry technique is the light pen which senses the time at which light appears at a selected spot on a scanned display screen as an indication of the location of the spot.

SUMMARY OF THE INVENTION

In general, the invention features apparatus for both entering input information into and displaying output information from a data processor, and which has imaging means including a plurality of elements each with a visual characteristic which depends on electrical stimulation of the element and is visible at a writing surface; the imaging means also includes conductive means arranged to deliver electrical stimulation to the elements; the imaging means is arranged to produce electrical manifestations at the conductive means in response to writing stimuli; and the apparatus also includes circuitry for delivering electrical signals to the conductive means to form an image of the output information visible at the writing surface and for converting the electrical manifestations to a digital form representative of the input information.

In preferred embodiments the elements comprise a fluid (e.g., liquid crystalline material) contained between the writing surface and a support layer parallel to and spaced from the writing surface; the conductive means includes a pair of electrodes associated with each element in such a way that the electrical manifestations correspond to changes in conductance of the element resulting from the stimuli; the writing surface is a resilient layer which is written on at locations corresponding to the input information; the conductive means includes sets of row conductors and column conductors which intersect to define locations corresponding to the elements; the circuitry includes driver circuitry which scans the row and column conductors to form the image and sensor circuitry which senses the electrical manifestations; and the apparatus also includes control circuitry for interlacing the operation of the driver and sensor circuitries.

The invention permits entering information and viewing an image simultaneously at the same writing surface. The device is thin enough to sit conveniently on a desk top. Information can be entered and displayed at the same time without flickering of the image.

DESCRIPTION OF THE PREFERRED EMBODIMENT

We first briefly describe the drawings. Drawings

STRUCTURE

Figure 1:
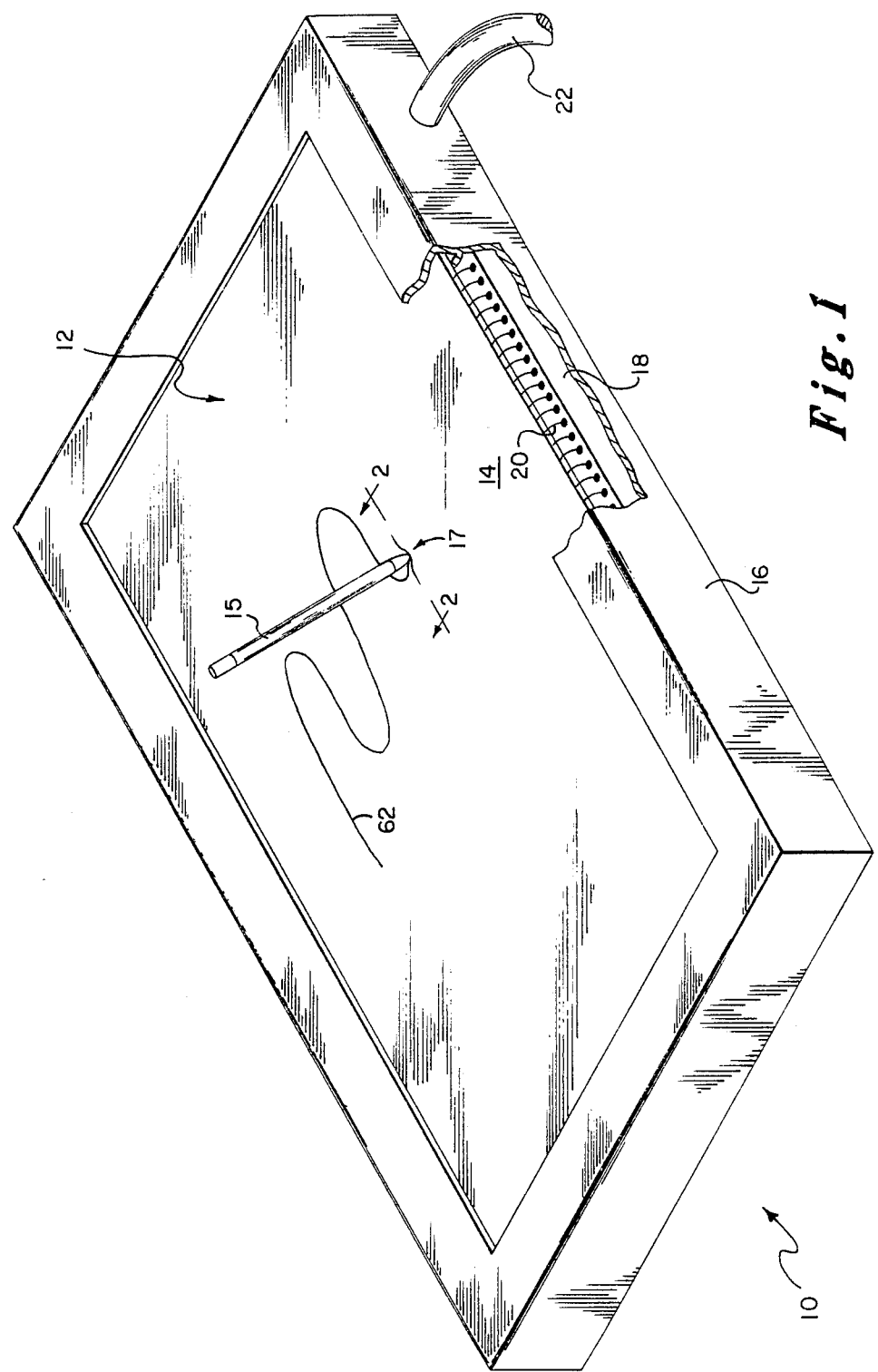
FIG. 1 is an isometric view of a touch pad, partially broken away.

Referring to FIG. 1, touch pad 10 has a large (e.g., 8½"×11") exposed resilient writing surface 12 for writing with a finger or stylus 15.

Figure 2:
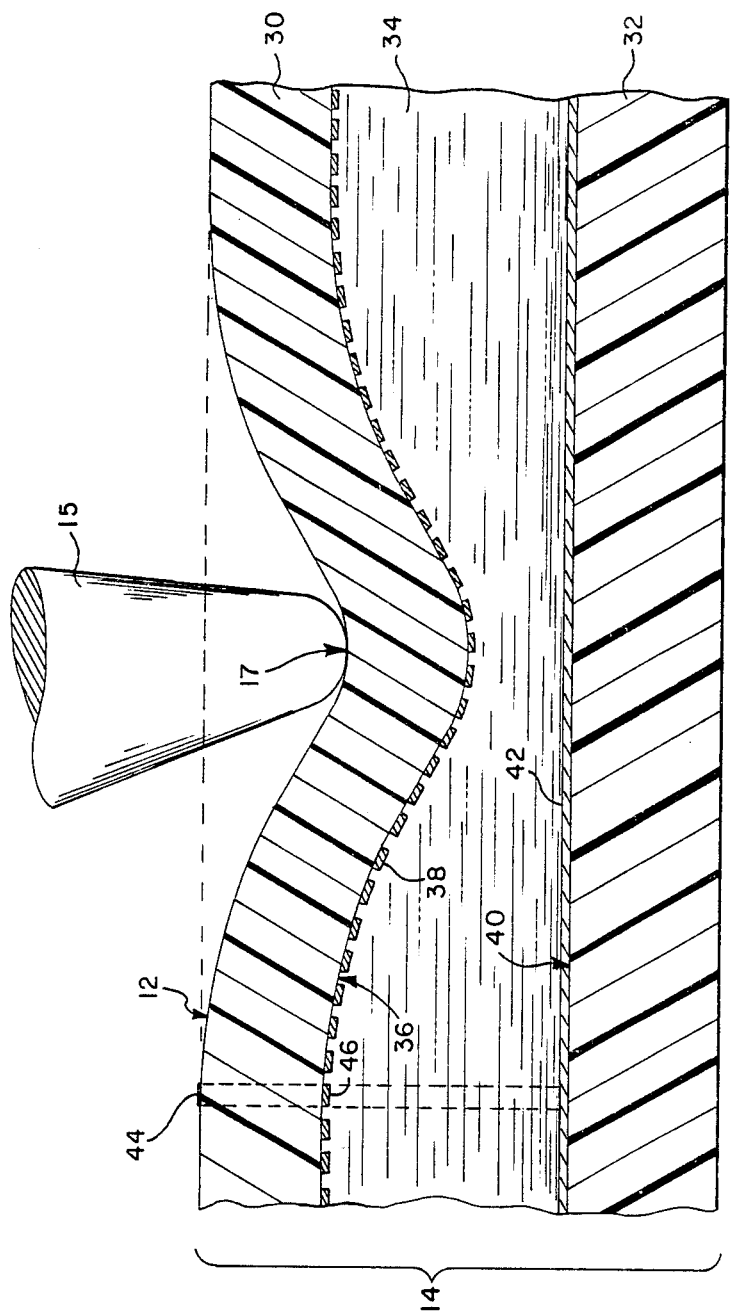
FIG. 2 is an enlarged cross-sectional view (at 2—2 in FIG. 1) of the pad sandwich of the pad of FIG. 1, not to scale.

Referring to FIG. 2, surface 12 is part of a pad sandwich 14 which includes a flexible, resilient, transparent plastic upper layer 30 spaced apart (e.g., with a spacing of 5 microns) from and parallel to a flexible plastic lower layer 32 to define a cavity 34 between them. A conventional liquid crystal material is held within the cavity by sealing together the upper and lower layers 30, 32 along the peripheral edges of sandwich 14 (not shown). The flexibility and resilience of layer 30 are such that pressing at a point on the surface (e.g., 17) will deform layer 30 in a localized region at the point of pressure, with the deformed region returning to its original position after the pressing stops. Layers 30, 32 are kept spaced apart either by a matrix of resilient supporting pillars inserted between them or by selection of a liquid crystal material having appropriate physical characteristics.

The bottom surface 36 of layer 30 is imprinted (by conventional thin-film technology) with a series of closely spaced (e.g., with a spacing of 0.005"), parallel, transparent, conductors 38 of a kind conventionally used in LCD displays. The top surface 40 of layer 32 is likewise imprinted with a series of closely spaced (e.g., with a spacing of 0.010"), parallel, transparent conductors 42. Only one conductor 42 appears on FIG. 2. Conductors 42 run along the length of pad 10 and conductors 38 along its width, thus forming a grid defining a matrix of pixels (display elements) on surface 12, each pixel being defined by the intersecting pair of conductors 38, 42 which underlie that pixel. For example, pixel 44 is defined by a particular conductor 46 of the conductors 38, and a particular one of the conductors 42.

Figure 3:
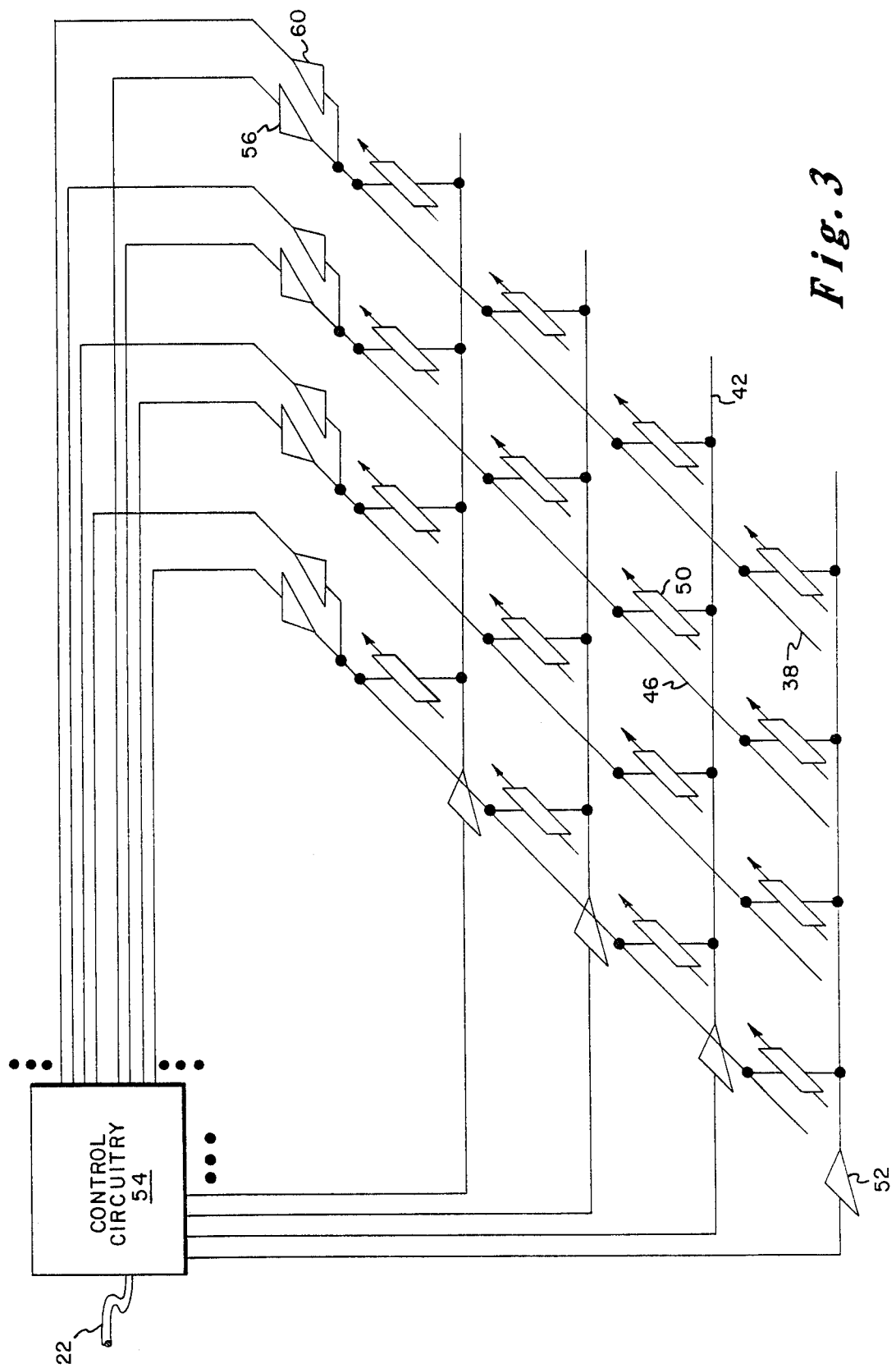
FIG. 3 is an equivalent circuit diagram corresponding to a representative portion of the pad sandwich and related electronics.

Referring to FIG. 3, conductors 42 can be viewed as forming rows and conductors 38 as forming columns in an equivalent circuit diagram. At each pixel location is shown an imaginary discrete circuit element 50 which represents the electrical characteristic of a localized path between the particular row and column conductors 38, 42, associated with that pixel. The electrical characteristic of each such element 50 is indicated (by means of an arrow) as variable to reflect the fact that when surface 12 is depressed at a pixel location, the resulting local physical deformation of layer 30 with respect to layer 32 will produce a change in the electrical characteristic. For example, the resulting localized reduction in distance between layers 30, 32 may increase the capacitance or decrease the resistance (or a combination of the two) between the associated top and bottom conductors 38, 42 depending on the materials and physical construction of pad 10. Whatever its precise character, the electrical change in the local path between conductors 38, 42, may be called a change in conductance.

For information display purposes, each row conductor 42 is connected to a conventional source driver 52 (e.g., type HD44780 or HD44100 available from Hitachi) for feeding current to the conductor. The source drivers 52 are all connected to control circuitry 54 for selectively triggering appropriate ones of the drivers 52. Control circuitry 54 is also connected to a set of conventional sink display drivers 56 (e.g., type HD44100H or HD44780 available from Hitachi). Each sink display driver 56 is in turn connected to one of the column conductors 38 for sinking current from the corresponding conductor when triggered by control circuitry 54.

For information input purposes, control circuitry 54 is also connected to a set of input sensors 60 (e.g., type MC14049UB available from Motorola). Each input sensor 60 is in turn connected to one of the column conductors 38 for sensing an electrical value related to the conductance of various ones of the elements 50 connected to the conductor, such conductances being indicative of which elements 50 are being subjected to pressure. Each sensor 60 can be of the type having CMOS inverter gates which detect whether the sensed voltage appearing across an element 50 as a result of the pressure of stylus 15 is greater than a threshold voltage of the gate. Each sensor 60 also includes a voltage comparator circuit (e.g., type $\mu$A3302 available from Fairchild) for allowing the detection of differential voltage levels, for a purpose discussed below.

Figure 4:
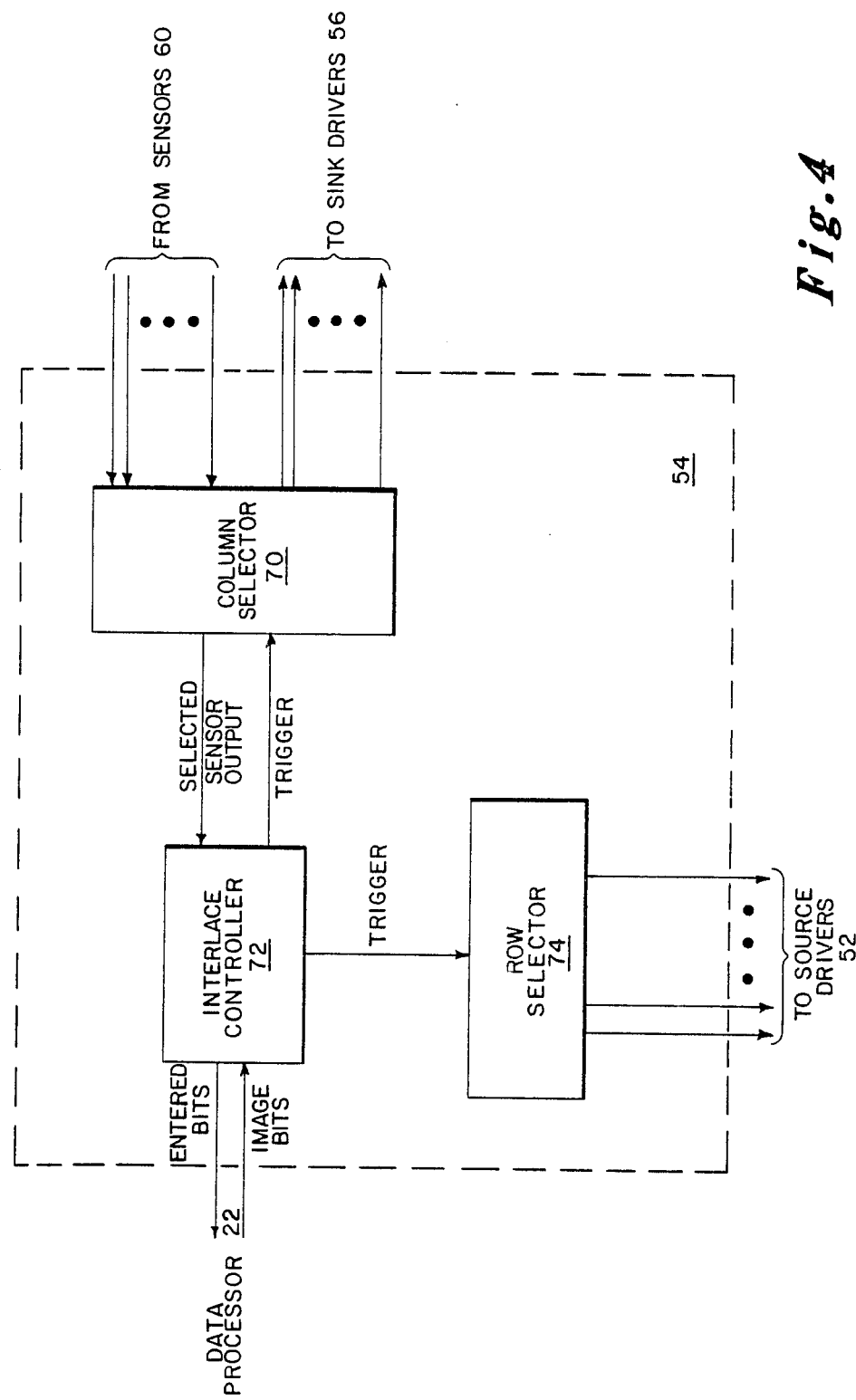
FIG. 4 is a block diagram of the control circuitry of FIG. 3.

Referring to FIG. 4, control circuitry 54 includes a column selector which accepts bits from particular sensors 60 (indicating which elements 50 are being subjected to pressure) and delivers display bits to sink drivers 56 (corresponding to an image to be displayed) as dictated by trigger signals provided from an interlace controller 72. Any output bit from a selected sensor 60 is passed from column selector 70 back to controller 72. Control circuitry 54 also includes a row selector 74 which delivers display bits to source drivers 52 likewise based on trigger signals from controller 72. Controller 72 interleaves the displaying of pixels of an image specified by the data processor with the reading of entered information which is passed back to the data processor, all via line 22.

Referring again to FIG. 1, the source drivers 52, sink display drivers 56, control circuitry 54, and sensors 60 are all included in electronic circuitry 18, mounted in housing 16. Conductors 38 and 42 are connected via leads 20 to circuitry 18.

A cable 22 enables control circuitry 54 to send and receive information bits to and from the data processor, corresponding to pixels which are to be displayed or input information which is to be read.

Operation

The pad is capable of simultaneously displaying output information from a data processor and receiving input information represented by pressure of stylus 15 at various points on surface 12 (e.g., the points along a line 62, FIG. 1).

Displaying an image is accomplished in the conventional way for LCDs. Each of the pixels corresponding to the output information is darkened by establishing an electrical field across the liquid crystal material between the two conductors associated with that pixel. The field is established by triggering the corresponding source and sink drivers 52, 56. The field temporarily alters the molecular alignment of the liquid crystal material at the pixel, causing it to appear darker. An entire image is generated by rapidly triggering in succession (that is, scanning) the appropriate sink display drivers 56 while one of the source drivers 52 is triggered, then repeating the process while another one of the other source drivers is triggered, and so on. By repeating the scanning process (refreshing the image) at a high rate of repetition, the image is seen without interruption.

Because the number of pixels defined by conductors 38, 42 is large, the time required to refresh a displayed image is likely to be long. Furthermore, the refresh cycles must follow each other with little intervening dead time to produce a flicker-free image. As a result, insufficient time may be available between refresh cycles to completely scan all elements 50 to determine which, if any, are being subjected to pressure by stylus 15. Instead controller 72 concurrently interlaces the displaying of pixels 44 with the reading of elements 50 in order to accomplish both in about the same time that would otherwise be required for displaying alone.

The concurrent interlacing is accomplished as follows. First a given row conductor 42 is activated by triggering the corresponding driver 52. While that row conductor 42 is activated, each sensor 60 is triggered in turn to read the elements 50 along row conductor 42. If a pixel 44 is also to be displayed at the same intersection between the active row conductor 42, and the column conductor 38 associated with the triggered sensor 60, then the corresponding sink driver 56 is triggered at the same time; if that pixel is not to be displayed, that corresponding sink driver is not triggered. Sensor 60 is arranged to sense pressure at the element 50 corresponding to that pixel whether or not that pixel is simultaneously being displayed. If that pixel is being displayed, the field used to cause the display may itself induce changes in the conductance of the corresponding element 50 similar to the changes produced by pressure on that element. In that case, the output of the source driver 52 is then used as an input to the voltage comparator circuit of sensor 60 to offset the effect of the drive voltage, thus permitting the sensor to detect that element 50 is being pressed.

Once all elements 50 have been scanned, the cycle is repeated.

The displayed information can be the same as, or different from, the input information. When the displayed and input information are the same, the pad allows the user to see immediately on the pad what he has just written. The device is thin enough to sit conveniently on a desk top with the writing surface facing up. Information can be entered and displayed at the same time without flickering of the image.

Other embodiments are within the following claims.

For example, the interlacing can be accomplished by an offset technique in which the triggered sensor 60 is in the adjacent column to the column in which the sink driver 56 is potentially triggered. In that case, the sensors 60 will always be sensing elements 50 corresponding to undisplayed pixels. However, the total scanning time required for both image displaying and reading will be one column longer in duration for each row scanned because of the offsetting of the reading and displaying operations.

The multiple sensors 60 could be replaced by a single sensor connected via a multiplexing switch (e.g., type MC14051B available from Motorola) to each of the columns to be sensed. The multiplexing switch would then be controlled by control circuitry 54.

We claim:

1. Apparatus for both entering input information into and displaying output information from a data processor, comprising
    a writing surface on which writing stimuli are applied by depressing said writing surface at locations corresponding to said input information,
    a plurality of elements associated with said writing surface and each comprising a single material that both produces electrical effects in response to said depressing of said writing surface and exhibits an optical characteristic in response to electrical stimulation of said material, said optical characteristic being visible at said writing surface,
    conductive means at which said electrical effects are produced in response to said depressing of said writing surface and arranged to deliver said electrical stimulation to said material
    control circuitry for delivering said electrical stimulation to said conductive means to form an image of said output information visible at said writing surface and for converting said electrical effects to a digital form representative of said input information.

2. The apparatus of claim 1 wherein said material comprises a fluid material contained between said writing surface and a support layer parallel to and spaced from said writing surface.

3. The apparatus of claim 2 wherein said fluid material comprises a liquid crystalline material.

4. The apparatus of claim 1 wherein said conductive means comprise a pair of electrodes associated with each said element.

5. The apparatus of claim 1 wherein said writing surface comprises a resilient layer.

6. The apparatus of claim 1 wherein said conductive means comprises a set of row conductors and a set of column conductors, said two sets intersecting to define a grid of locations each corresponding to one of said elements.

7. The apparatus of claim 6 wherein said control circuitry comprises driver circuitry for scanning selected said row conductors and said column conductors to form said image, and sensor circuitry for sensing said electrical effects at selected said column conductors.

8. The apparatus of claim 7 further comprising control circuitry for interlacing the operation of said driver and sensor circuitries.

9. The apparatus of claim 4 wherein said electrodes and the associated said material are arranged so that said electrical manifestations correspond to changes in conductance of said element resulting from said stimuli.

* * * * *